Patented Jan. 10, 1950

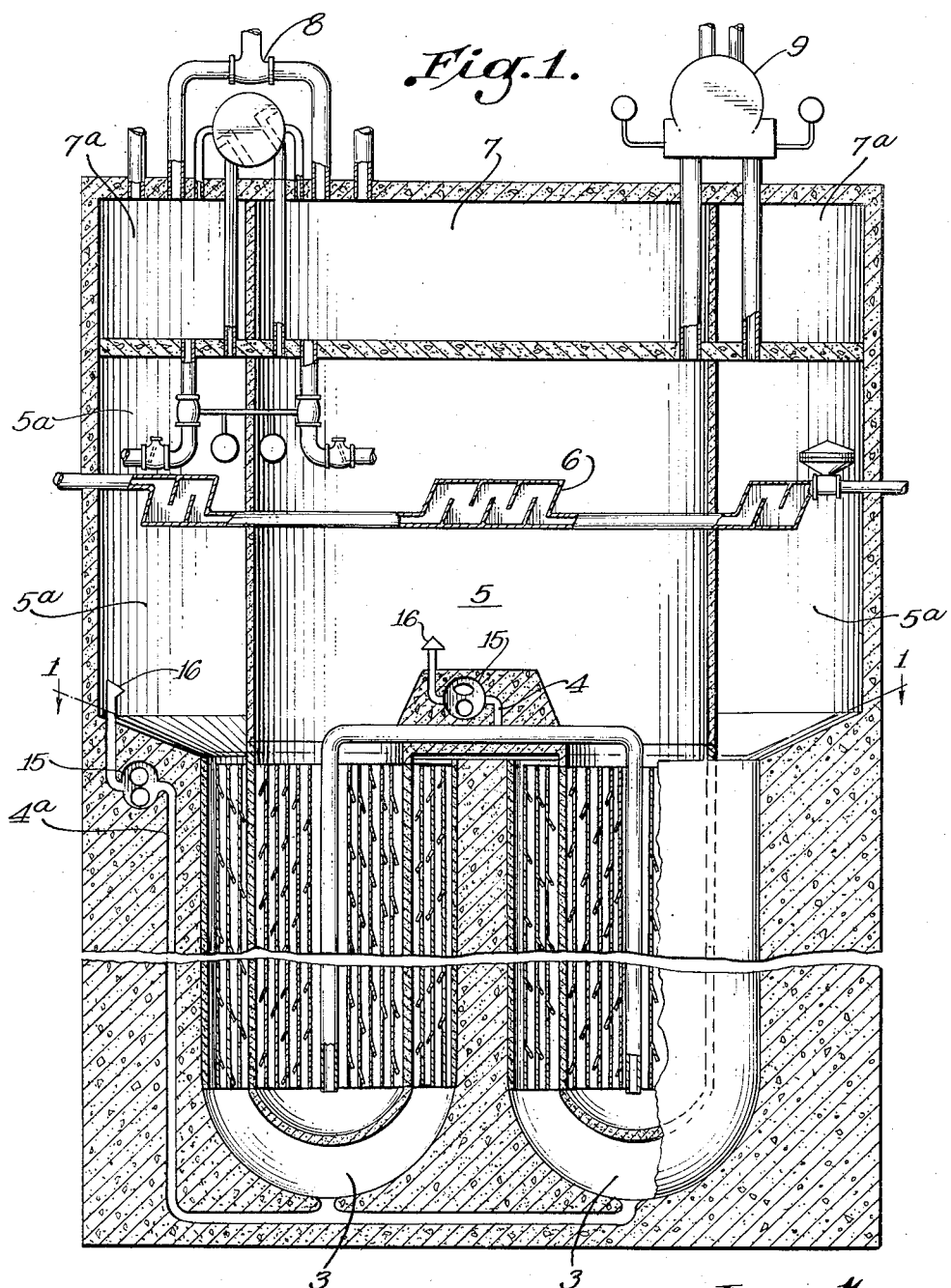

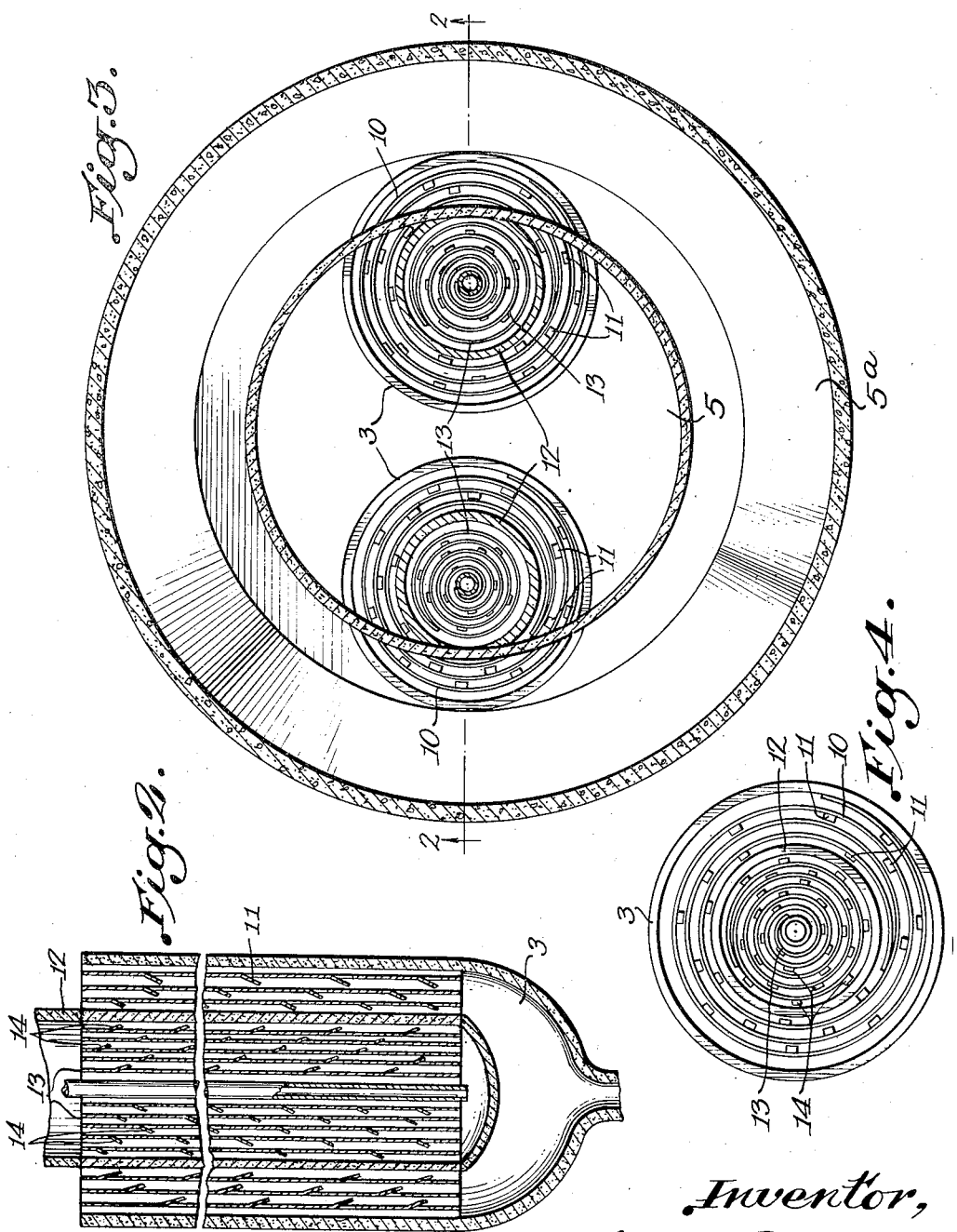

2,494,264

UNITED STATES PATENT OFFICE 2,494,264

PRESSURE ELECTROLYZER

Rexford C. Ryman, San Francisco, Calif.

Application April 26, 1947, Serial No. 744,168

4 Claims. (Cl. 204—239)

This invention relates to the production of hydrogen and oxygen under pressure by the electrolysis of water and shall be known as a pressure electrolyzer.

The primary object for the invention of a pressure electrolyzer is the subsequent utilization of the resulting products and pressure for power production by means of turbines, jet-propulsion, internal and/or external combustion engines or any combination thereof.

The secondary object for the invention of a pressure electrolyzer is the subsequent utilization of the resulting products and pressure for commercial uses including the preparation of liquid or solidified hydrogen and/or oxygen.

Another object of the present invention is to simplify and improve the construction of electrolyzers to the better utilization of space.

Another object of this invention is to provide a cell of the kind indicated in which the internal resistance is substantially constant and uniform over the entire area of the electrodes.

Another object of this invention is the provision that the construction of the entire unit will withstand very high internal pressures which may be created by the formation of the respective gases and/or by the introduction of additional electrolyte into the circuits to further compress the gases.

Further and other objects of the present invention will be hereinafter set forth in these specifications and claims which are considered to be preferred embodiments of the invention.

Proceeding now to a more detailed description, additional reference is made to the accompanying drawings as follows:

Figure 1 is a side elevation view of the embodiments of a two cell electrode unit along the line 2—2 of Figure 3. The unit consists of two electrolyzer cells as indicated by 3 of Figure 1; the electrolyte circulating system for the oxygen electrode 4 and the electrolyte circulating system for the hydrogen electrode 4a; the rinsing, cooling and collecting oxygen chamber 5 while 5a represents the rinsing, cooling and collecting hydrogen chamber; the cooling system 6; the water reservoir 7 for supplying the oxygen electrode while 7a is the water reservoir for supplying the hydrogen electrode of which both (7 and 7a) are connected with the water intake arrangement 8. The designation 9 is a combination pressure equalizer together with the withdrawal valves for the gases.

Figure 2 is a vertical mid-section side view of an electrolyzer cell. The unit consists of the hydrogen spiral electrode 10 with the special rectangular perforations and projections 11; the porous diaphragm 12 separating the electrolyzer cell into two chambers; and 13 is the spiral oxygen electrode with the special rectangular perforations and projections 14.

Figure 3 is a central horizontal top view directly above the electrolyzer cells as indicated by line 1—1 of Figure 1. The view of Figure 3 discloses the base of the oxygen collecting chamber 5 and the base of the hydrogen collecting chamber 5a and the top of the two electrolyzer cells as indicated by 3 of Figure 1. Returning to Figure 3 the two electrolyzer cells each outline the positions of the hydrogen electrode 10, the porous diaphragm 12, and the oxygen electrode 13 in their respective positions.

Figure 4 is a mid-section top horizontal view of the electrolyzer cell disclosing the hydrogen spiral electrode 10 with the special rectangular perforations and projections 11; the porous diaphragm 12 separating the electrolyzer cell into the two chambers; and 13 is the spiral oxygen electrode with the special rectangular perforations and projections 14.

The invention consists of a cell or a group of cells equipped with tube spiral-type positive and negative electrodes, gas separation diaphragm, gas collecting chambers with connected accessories, all enclosed within a pressure resistant container and equipped with the means of introduction and the circulation of the electrolyte. The gas collecting chambers are utilized also as gas rinsing and cooling units. The positive electrode (13 of Figure 2) which is the central unit of each electrolyzer cell is constructed of a sheet of metal, preferably sheet iron of No. 30 gauge or lower with a very small percentage of carbon content, which is attached to a central pipe of small diameter. The sheet metal is coiled in spirals around the pipe and the outer edge of the sheet metal is firmly attached to the adjacent spiral. The sheet metal has special rectangular perforations with projections (14 of Figure 2), systematically arranged to permit and guide a rising gas to pass toward the center of the electrode. All coils of the spiral surrounding the central pipe of the positive electrode are spaced to permit the passage of gas from the lower extremity of the electrode to the top of the electrolyzer cell. At the upper extremity of the electrode the sheet metal is somewhat shorter than its central anchorage to permit the passage of oxygen into the entrance which leads to the oxygen collection chamber. No perforations or openings are provided into the central passageway of the pipe through the spirals as the passageway is utilized to permit the flow of electrolyte from the storage supply of the electrolyte located in the oxygen collection chamber (5 of Figure 1) to the lower extremity of the electrolyzer cell. The arrangement induces additional ionization of the electrolyte while passing through the electrode as well as affording a direct passage of electrolyte from the oxygen collection chamber to the bottom of the electrolyzer cell which also further ensures additional purity of gases produced. The oxygen electrode is covered with a coating of nickel approximately 0.003 inch thick.

Surrounding the anode or oxygen electrode is the gas separation porous diaphragm (12 of Figure 2) which serves to prevent the diffusion of the gases that develop on the electrodes. The diaphragm divides the space within each cell into two chambers, one containing the positive electrode and the other containing the negative electrode.

The cathode or hydrogen electrode (10 of Figure 2) is the outer unit of each electrolyzer cell. It is constructed and assembled in a similar but reverse method than that of the oxygen electrode. The sheet metal is attached inside of a much larger cylindrical pipe and the inner edge of the sheet metal is firmly attached to the adjacent spiral. The sheet metal has special rectangular perforations with projections (11 of Figure 2) systematically arranged to permit and guide a rising gas to pass toward the perimeter of the electrode. All coils of the spiral electrode are spaced to permit the passage of gas from the lower extremity of the electrode to the top of the electrolyzer cell. However, at the upper extremity of the cathode the sheet metal is somewhat shorter than the cylindrical pipe to which it is attached and the upper extremity of the sheet metal forms with the underside base of the oxygen collection chamber a duct or passageway for nascent hydrogen mixed with electrolyte which is free to flow outside the perimeter of the oxygen collection chamber directly into the base of the hydrogen collection chamber.

The invention provides while in operation for a continuous flow of the electrolyte which consists of water and a catalyst. The circuit of the electrolyte flows from the electrolyzer cell to the respective gas collecting chambers and return with each electrode assigned an individual circuit. Natural circulation is augmented by mechanical circulating pumps (15 of Figure 1) installed in the electrolyte circuit lines. Filters (16 of Figure 1) keep the electrolyte free from suspended matter. The forced circulation of the electrolyte serves a number of purposes. It assists in the prevention of local differences of electrolyte concentration and assists to reduce polarization concentration. Also, the circulation of the electrolyte augments the limiting current density and assists to prevent film formations of the gases on the electrodes. In addition, the circulation of the electrolyte provides a means of continuous uniform rinsing of the electrolyzer cell and assists in the maintenance of a uniform temperature throughout the entire unit.

Another object of this invention is a provision for electrode electrical connections (not disclosed in drawings) from an outside source of direct electrical current which emerges in the circuit of the electrolyte through the electrodes to accomplish the separation of the water into its respective gases of hydrogen and oxygen. As previously indicated the positive and negative electrodes are arranged with outlet openings to permit the passage of the electrolyte together with the respective gases into their respective collection chambers. Wherever possible non-electric conduction materials are used in the construction of this invention with the exception of the electrodes and the necessary electrical connections.

An installation of this type of a pressure electrolyzer consists of the requisite number of cells to fulfill the requirements of the pressures and the gases. The unit is complete with pressure-balanced gas washers, coolers and with a water-feed system.

While the foregoing embodiments of this basic invention are preferred embodiments, it is understood that it is not desired that the invention be limited to the exact details of process, design or construction as shown and described as obvious modifications such as electrical current reversal etc. will occur to any person skilled in designing and construction work. In other words this invention is a basic invention which has been in various stages of development since 1918 and will not permit circumvention by a little ingenuity in change of design or construction. On the other hand, I am aware and realize that prior to my invention, electrolyzers and pressure electrolyzers have been invented with spiral electrodes, with perforations and projections in the form of spirals and corrugations variously arranged within pressure resistant containers and which in some respects bear a similarity to my invention. I do not claim such electrolyzers or pressure electrolyzers broadly; but with the foregoing explanation of my invention.

I claim:

1. A pressure electrolyzer for water electrolysis and comprising in combination a plurality of cylindrical, electrolytic cells with spiral sheet electrodes, each in an upright position arranged side by side but electrically insulated from each other excepting the electrical connections by regular electrical conductors and all said cells located within the base of an electrically insulated, cylindrical, pressure resistant container, with each electrode of each electrolytic cell directly connected for gas and electrolyte passage to the upper region of said pressure resistant container to a common gas rinsing, cooling and gas collecting chamber for each respective gas, said pressure electrolyzer additionally equipped with water storage tanks located within the upper region of said pressure resistant container, each provided with an arrangement of pipes and valves whereby water is supplied to said storage tanks from an outside source and fed, as required, into the electrolyte of each said gas collecting chamber with said each gas collecting chamber equipped with a filter and inlet conduit located within and projected above the base, with each said inlet conduit connected for electrolyte circulation to an individual mechanical pump from which outlet conduits direct the circulation of said electrolyte to the base of each electrode for the return of said electrolyte through the electrodes to the said rinsing and cooling units accompanied by the nascent gases.

2. A pressure electrolyzer for water electrolysis as described in claim 1 in which each electrolytic cell is equipped with an anode occupying the central position of said cell and comprises in combination an electrically conducting central pipe which is also utilized as an electrolyte conduit to the base of the anode and about which is coiled sheet metal containing special rectangular, horizontal perforations with the inside rectangular areas remaining attached to the perforation topside and inclined outward to form projections and of which one edge of said sheet metal is securely attached to the said central pipe and spiraled to the perimeter of the electrode with the exterior edge of the said sheet metal securely attached to the adjacent spiral with the said perforations and projections spaced and arranged to guide and direct the flow of rising nascent oxygen and electrolyte contiguous to the said electrically conducting central pipe while the entire surface area of said anode is nickle-plated to withstand the chemical action of nascent oxygen.

3. A pressure electrolyzer for water electrolysis as described in claim 2 in which each electrolytic cell has a porous diaphragm surrounding the upright cylindrical section of the anode and separating the said electrolytic cell into two chambers of which one chamber comprises the said anode occupying an upright central position of the said electrolytic cell and the other chamber comprises the cathode which vertically surrounds said anode chamber with the cathode occupying the perimeter position of the said electrolytic cell, while the said porous diaphragm is attached to the floor of the oxygen rinsing, cooling and collecting chamber and is retained in position by the special projections of the electrodes with the lower extremity of the said porous diaphragm joined to the base of the anode electrode.

4. A pressure electrolyzer for water electrolysis as described in claim 3 in which each electrolytic cell is equipped with a cathode electrode surrounding the upright cylindrical diaphragm and anode electrode while the former cathode occupies the perimeter area of said electrolytic cell and comprises in combination a large cylindrical pipe which also serves as the outer wall of said electrolytic cell and which has attached inside, a coiled, spiraled sheet metal containing special rectangular, horizontal perforations with the inside rectangular areas remaining attached to the perforation topside and inclined outward to form projections and with the innermost edge of said coiled and spiraled sheet metal securely attached to the adjacent spiral with the said perforations and projections spaced and arranged to guide and direct the flow of rising nascent hydrogen and electrolyte contiguous to the outer wall of said electrolytic cell.

REXFORD C. RYMAN.

REFERENCES CITED

The following references are of record in the file of this patent:

UNITED STATES PATENTS

| Number | Name | Date |
|---|---|---|
| 816,355 | McCarty | Mar. 27, 1906 |
| 1,600,478 | Lawaczeck | Sept. 21, 1926 |
| 1,896,718 | Noeggerath | Feb. 7, 1933 |
| 2,007,096 | Niederreither | July 2, 1935 |

FOREIGN PATENTS

| Number | Country | Date |
|---|---|---|
| 543,757 | Germany | Nov. 5, 1932 |
| 675,754 | France | Nov. 8, 1929 |
| 811,238 | France | Jan. 14, 1937 |